United States Patent
Liu

(10) Patent No.: US 6,874,245 B2
(45) Date of Patent: Apr. 5, 2005

(54) SOFT STOP-PROOF HOOK HEAD OF A MEASURE TAPE

(76) Inventor: Yu-Chun Liu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/315,206

(22) Filed: Dec. 10, 2002

(65) Prior Publication Data

US 2004/0064962 A1 Apr. 8, 2004

(30) Foreign Application Priority Data

Oct. 8, 2002 (TW) ...................... 91215948 U

(51) Int. Cl.⁷ ................................. G01B 3/10
(52) U.S. Cl. .......................................... 33/758; 33/770
(58) Field of Search .................. 33/758, DIG. 1, 33/755, 768, 769, 770, 759

(56) References Cited

U.S. PATENT DOCUMENTS

| | | | | |
|---|---|---|---|---|
| 1,006,056 A | * | 10/1911 | Bowers | 33/770 |
| 5,077,911 A | * | 1/1992 | von Wedemeyer | 33/770 |
| 5,894,677 A | * | 4/1999 | Hoffman | 33/758 |
| 6,226,886 B1 | * | 5/2001 | Lamond et al. | 33/769 |
| 6,442,863 B1 | * | 9/2002 | Poineau et al. | 33/758 |
| 6,568,099 B2 | * | 5/2003 | Bergeron | 33/770 |

FOREIGN PATENT DOCUMENTS

JP    6-147802    * 5/1994 ............ 33/758

* cited by examiner

Primary Examiner—Christopher W. Fulton

(57) ABSTRACT

A soft stop-proof hook head of a measure tape is located at one end of the measure tape and comprises a ruler hook. A surface of a ruler hook is enclosed by a soft elastomer. The soft elastomer is made of a flexible material. When the soft elastomer is pressed, it generates an elastic resistance; in measuring, the ruler hook is coupled to a measured bench mark of an object to be measured with a slide-stop effect. Moreover, the soft elastomer is extended with a slide piece for enhancing the slide-stop effect.

5 Claims, 8 Drawing Sheets

SOFT STOP-PROOF HOOK HEAD OF A MEASURE TAPE

FIELD OF THE INVENTION

The present invention relates to measure tapes, and particularly to a soft stop-proof hook head of a measure tape, in that the hook head has a ruler hook, the ruler hook is enclosed by a soft elastomer so as to present a preferred slide-stop effect.

BACKGROUND OF THE INVENTION

Referring to FIG. 1, it is illustrated that a prior art ruler 92 of a measure tape is made as a long metal thin piece, for example, a steel strip by cold rolling. A distal end of the ruler is riveted with an L shape ruler hook 91 for hooking a measured bench mark of an object to be measured. To enhance the stability of the ruler hook 92, a pad 93 is added at a bottom of the ruler.

In measuring, in general, the ruler hook is hung upon the measured bench mark of an object having a right angle on the shape of the object. When the object to be measured has an inclined slope, a cambered section, or a spherical surface, such as a round tube, a round edge, a round corner, a ball, etc., the ruler hook 91 is easily to slide out. When the ruler vibrates, the ruler hook very possibly slides out so that the measurement is stopped. When the measured bench mark is at a smooth surface, the ruler hook is easy to slide thereon so that the measurement is difficult. Therefore, to improve this problem, as shown in the FIG. 2, a distal end of the ruler hook is added with a small hook 94 or a positioning nail 95 is used to fix the ruler hook.

However, above way is used in finite cases. For example, the ruler hook 91 with a small hook 94 is only used to a recessed measured bench mark. The positioning nail 95 is only used for a wood material. Moreover, the above mentioned ways are only used in some special cases, but most of the conditions are not suitable by the prior art ways.

SUMMARY OF THE INVENTION

Accordingly, the primary object of the present invention is to provide a soft stop-proof hook head of a measure tape, the hook head being located at one end of the measure tape and comprising a ruler hook. A surface of a ruler hook is enclosed by a soft elastomer. The soft elastomer is made of a flexible material. When the soft elastomer is pressed, it generates an elastic resistance. In measuring, the ruler hook is coupled to a measured bench mark of an object to be measured with a slide-stop effect. Moreover, the soft elastomer is extended with a slide piece for enhancing the slide-stop effect.

The various objects and advantages of the present invention will be more readily understood from the following detailed description when read in conjunction with the appended drawing.

DETAILED DESCRIPTION OF THE PREFERRED EMBODIMENTS

The present invention will be described hereinafter.

Figure 4:
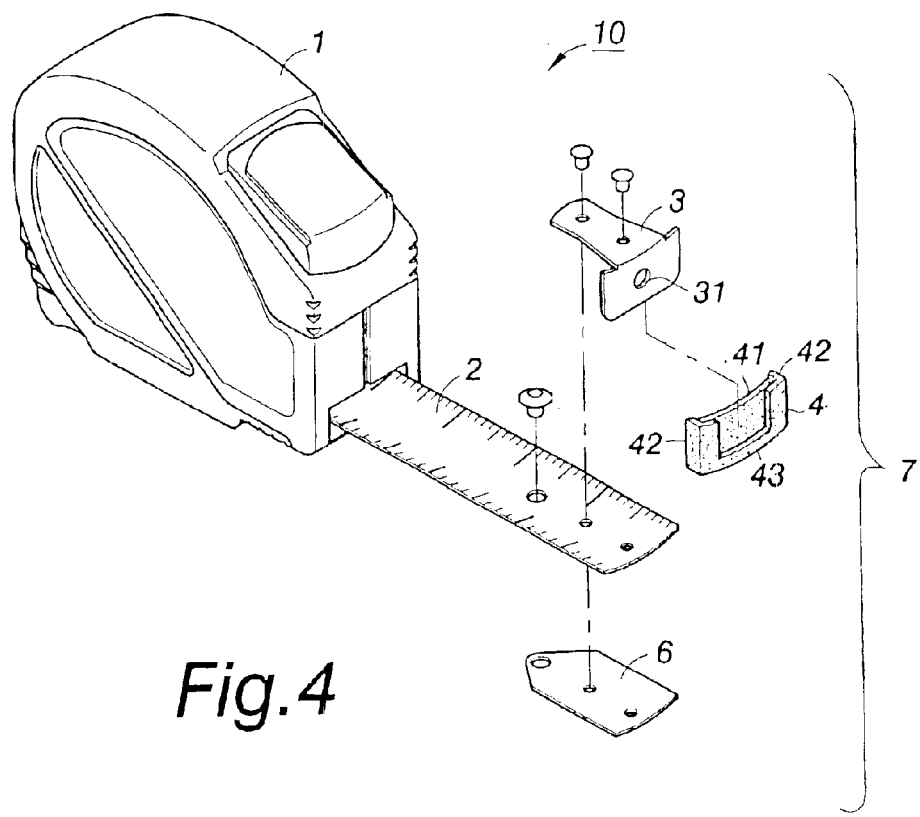
FIG. 4 is an exploded perspective view of a slide-stop hook head of the measure tape of the present invention.

Referring to FIG. 4, the hook head of a measure tape of the present invention is illustrated. The measure tape 10 has a casing 1. A ruler blade 2 embedded in the casing 3 can be pulled out from the casing 1. A front end of the ruler blade 2 is riveted with a ruler hook 3 having an L shape. To enhance the steadiness of the ruler hook 3, the front end of the ruler blade 2 can be riveted with a pad 6. The feature of the measure tape of the present invention is that a soft elastomer 4 is combined with the ruler hook 3 to be as a soft sliding-stop hook head 7, as shown in the FIG. 5.

The soft elastomer 4 may be made of flexible material with lower viscosity. The elastic of the soft elastomer 4 is beneficial for generating an elastic resistance. When the ruler hook 3 is used as an internal structure, the ruler hook 3 can be well adhered to an object to be measured so as to have a preferred slide-stop effect. The material of the soft elastomer 4 can be selected from one of a group containing: PVC, TPR, TPU, TPE, PU. rubbers, silicide, foam, resin or mixing rubbers. The elasticity of the soft elastomer 4 is between 20 and 80 Nt/m. The characteristic of the soft elastomer 4 is soft, and a width of one surface is between 0.1 to 0.5 mm. However, some hardening material or other resins can be added thereto so as to increase the hardness to a desired value.

Figure 5:
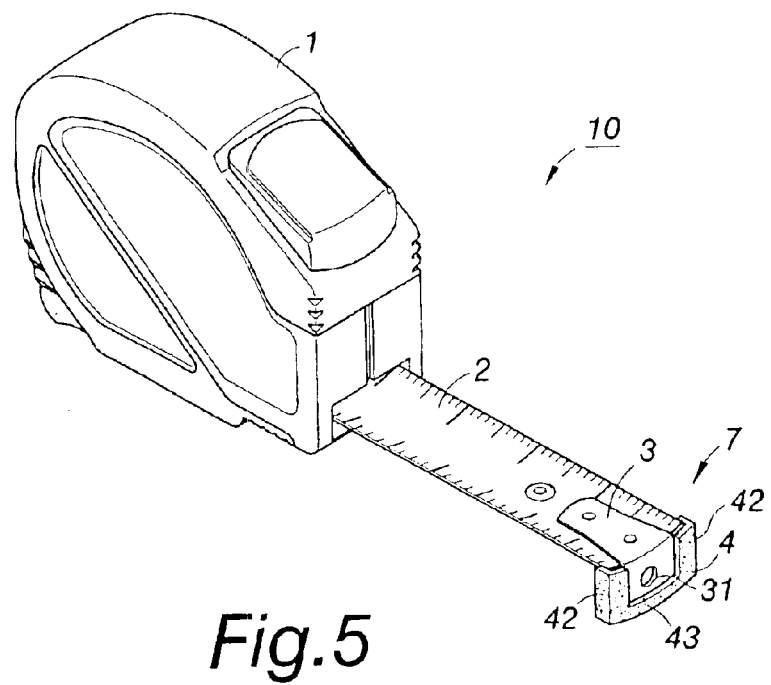
FIG. 5 is a schematic perspective view of the measure tape and slide-stop hook head of the present invention.
Figure 6:
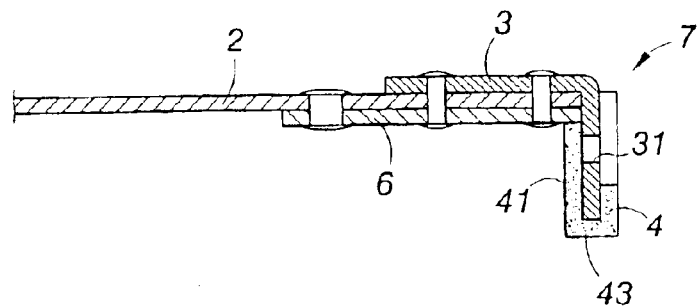
FIG. 6 is a cross section view of the hook head of the present invention.
Figure 7:
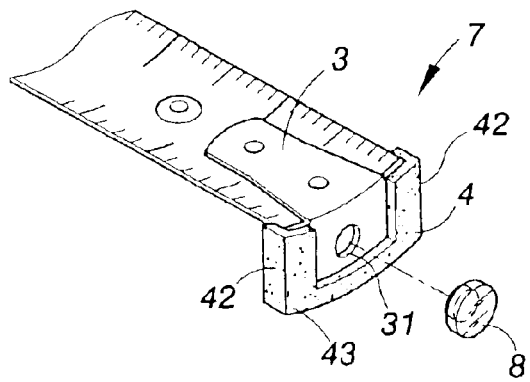
FIG. 7 is a schematic view showing the hook head of the present invention is combined to a magnet.
Figure 8:
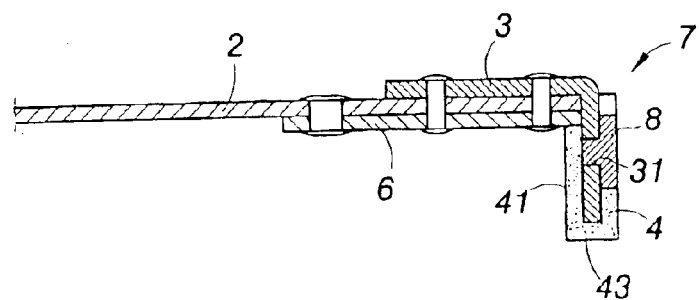
FIG. 8 shows that the hook head of the present invention is combined with a magnet.

Referring to FIG. 6, a cross section view of the elastic hook head of the ruler of FIG. 5 is illustrated. The soft elastomer 4 is pre-produced as a hook cover. The soft elastomer 4 can be assembled to or detached from the ruler hook 3 as desired. For example, in general, the hook cover is not used, while when the measured bench mark of the object to be measured is oblique, or round cambered or is a ball surface, it is assembled. The ruler hook 3 can enclose the whole surface of the ruler hook 3. Or, as illustrated in FIG. 6, only the inner lateral surface 41, two lateral frames 42 and bottom frame 43 encloses the ruler hook 3, and only the lower out side is not enclosed because when the ruler hook 3 has a though hole 31. A magnet 8 can be embedded into the though hole 31, as shown in the FIG. 7. The magnet 8 can absorb a metal object to be measured. Moreover, the inner lateral surface 41 of the soft elastomer 4 can be formed with a though hole and then the magnet 8 passes through the though hole 111 so as to contact the object to be measured. Besides, the lower the viscosity of the hook cover, the higher the flexibility. For example the soft elastic hook cover made of silicon rubber or resin, the adhering and slide-stop function can be increased greatly, but the hook head 7 will be adhered with dusts. If too much dusts are adhered on the hook head 7, the hook head 7 can be deserted and thus is as a disposable object. This low viscosity hook head 7 is used for a measured bench mark of a large cambered surface or a spherical surface. It can be deserted after measuring.

Figure 9:
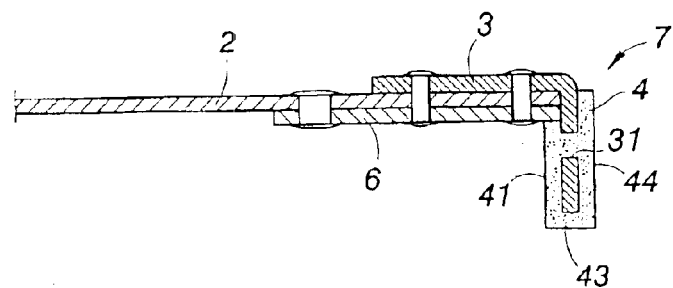
FIG. 9 is a cross section view showing another embodiment of the hook head of the present invention.

With reference to FIG. 9, the soft elastomer 4 can be formed by molding and then is enclosed within a surface layer of the ruler hook 3, or a melted liquid elastomer encloses the surface of the ruler hook 3 and after cooled, a desired shape is formed, for example, by sinking, coating, spraying, etc. An inner and outer surfaces of the shaped soft elastomer 4 are combined as an integral body by a though hole 31 or not by any though hole.

Figure 10:
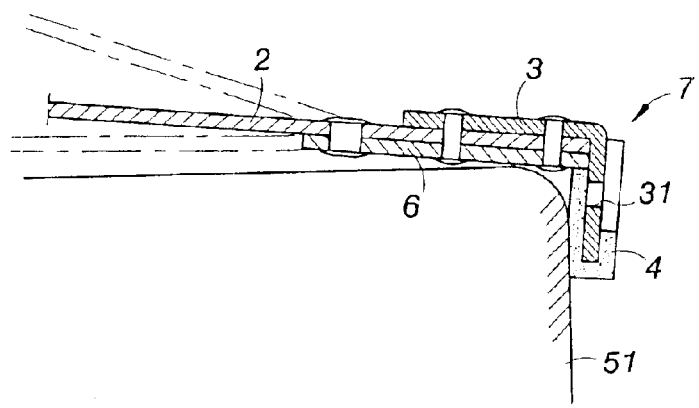
FIGS. 10 and 11 are schematic views showing that the hook head of the present invention is used to measure a wall.

By the adhering and slide-stopping effect of the soft elastomer 4, the hook head 7 has a preferred hooking ability, as shown in the FIG. 10. When the hook head 7 is hung from a round table edge 51, it can be fixed by the flexibility of the soft extending joints. Moreover, the displacement and release will not be affected by the vibration of the ruler blade 2. This is because of the slide-stop function of the soft elastomer 4 so that it can be steadily adhered to the surface of the table edge. Besides, in measuring, the oblique hook head 7 of ruler blade 2 will not slide or displace, and the angle between the ruler blade 2 and the base surface can be as great as 45 degrees.

Figure 11:
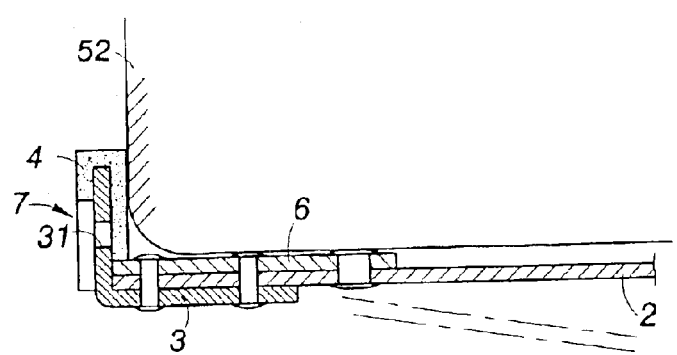

Referring to FIG. 11, when the user measures a ceiling, the hook head 7 can be suspended from a cambered measured bench mark (surface) 52, in the process of pulling the ruler blade 2, if it shakes up and down, or leftwards and rightwards, by the adhering and slide-stop effects of the soft elastomer 4, the ruler blade 2 will not separate easily. Otherwise, in measuring as the ruler blade 2 is inclined, the hook head 7 will not slide out or displace. In this case, the angle between the ruler blade 2 and the base surface can be as great as 30 degrees. Moreover, as measuring along a transversal direction or a vertical direction, the angle between the ruler blade 2 and the base surface can be as great as 45 degrees.

Figure 12:
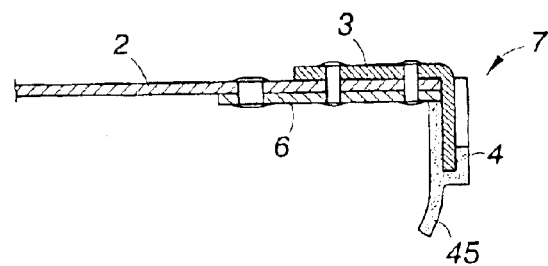
FIG. 12 is a cross section view showing that the hook head of the present invention is extended with a slide-stop piece.
Figure 13:
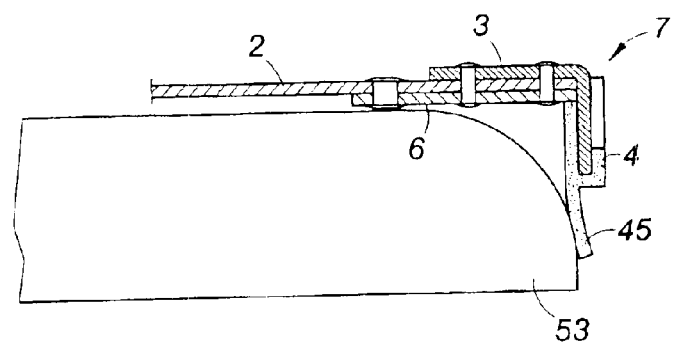
FIGS. 13 to 16 are schematic view showing that the hook head of the present invention is used to measure an object by using a slide-stop piece.
Figure 14:
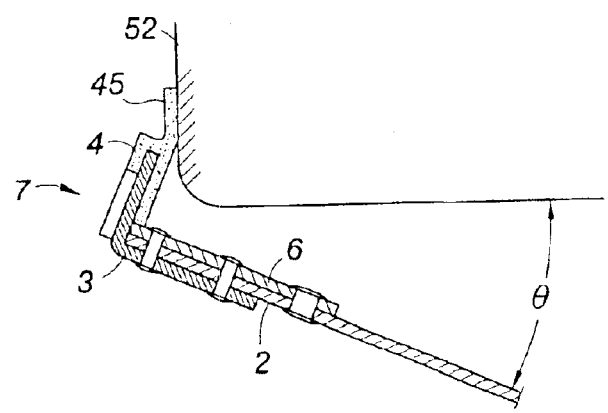

Referring to FIG. 12, to increase the adhering and slide-stop effect of the soft elastomer 4, a lower end of the soft elastomer 4 is extended with a slide-stop piece 45. Preferably, the slide-stop piece 45 shifts inwards with 30 degrees. By the deformation of the slide-stop piece 45, the hook head 7 is easily hung upon a measured object having a larger curvature or a smooth object. Moreover, the measuring space between the ruler blade 2 and the measured bench mark is larger. Referring to FIG. 13, it is illustrated that the hook head 7 is hung upon a measured bench mark 53 of a larger cambered surface. Referring to FIG. 14, the hook head 7 is hung upon the cambered measured bench mark (surface) 52. By the adhering and slide-stop functions of the soft elastomer 4 and the slide-stop piece 45, the hook head 7 is fixed thereon. Otherwise, the ruler blade 2 can downwards or outwards shift with an angle $\ominus$ (which may be as great as 45 degrees) in measurement. For example, measuring a length of an inclined surface or a length of an inclined side between the first measured bench mark and the second measured bench mark.

Figure 15:
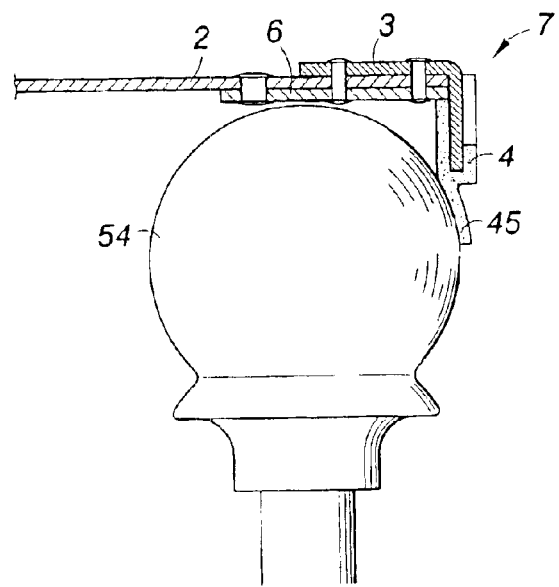
Figure 16:
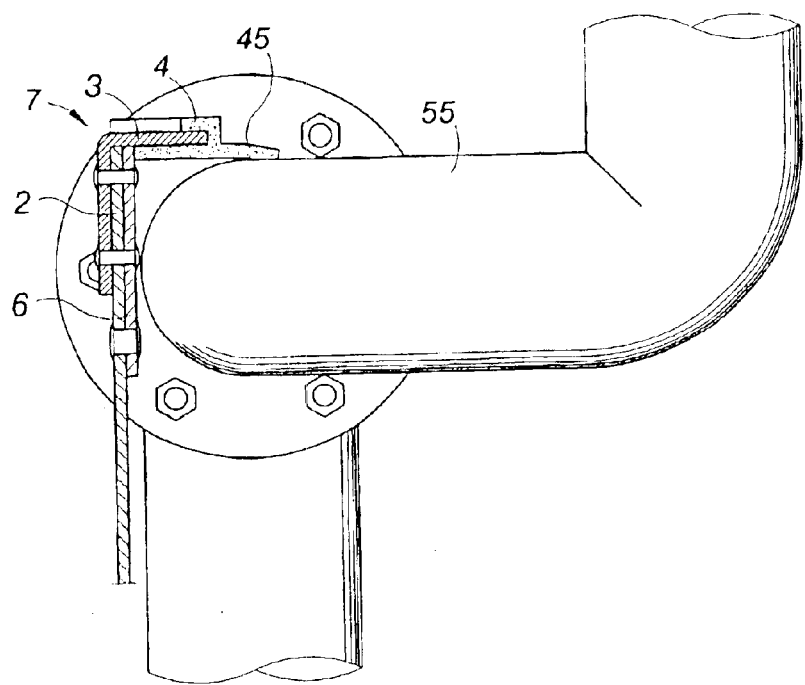

Moreover, referring to FIG. 15, in that, the present invention is used to measure a measured bench mark (surface) of a ball surface 54, and the referring to FIG. 16, in that, the present invention is used to measure a measured bench mark (surface) of a tubular object 55. However, in these cases, the present invention can achieve a preferred effect.

Figure 17:
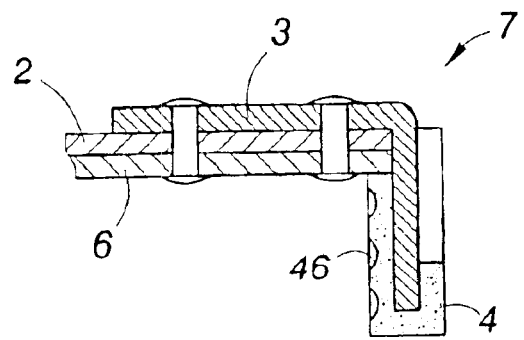
FIGS. 17 and 18 are cross section views showing another embodiment of the hook head of the present invention.
Figure 18:
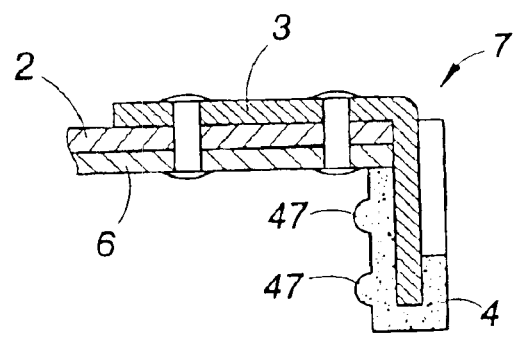

Referring to FIGS. 17 and 18, an inner side of the soft elastomer 4 is added with a concave small air chamber 46 or slide-proof particles 47, or slide-proof textures (pfor example, convex or concave textures) so that a larger absorption effect is generated between the soft elastomer 4 and the measured bench mark of the object to be measured.

Figure 19:
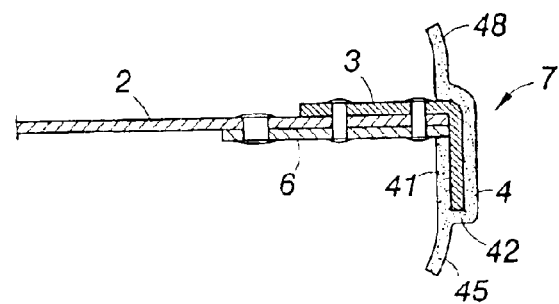
FIG. 19 shows another embodiment of the hook head of the present invention.

With reference to FIG. 19, an upper end of the soft elastomer 4 is extended with a slide-stop piece 48 which has a function like that of slide-stop piece 45. The slide-stop piece 48 of the hook head 7 is mainly used to hang the measured bench mark of an object at an upper side.

Figure 1:
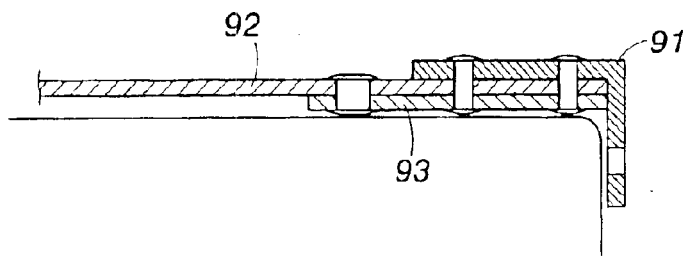
FIG. 1 is a schematic view showing a ruler hook of a prior art measure tape.
Figure 2:
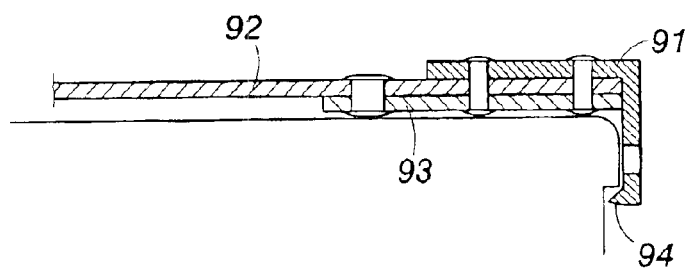
FIG. 2 is a schematic view showing that a ruler hook of a prior art measure tape in measuring an object.
Figure 3:
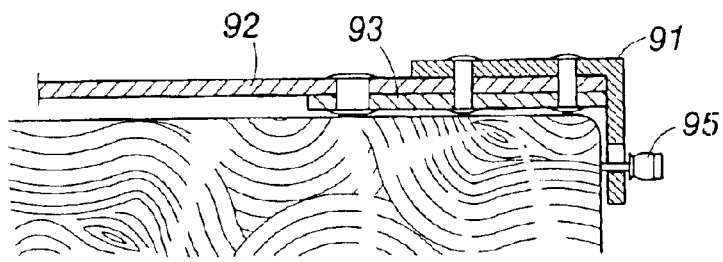
FIG. 3 is another schematic view showing that a ruler hook of a prior art measure tape in measuring an object.
Figure 20:
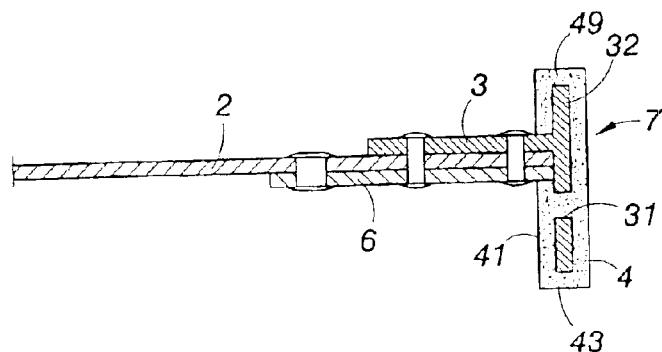
FIG. 20 shows a further embodiment of the hook head of the present invention.
Figure 21:
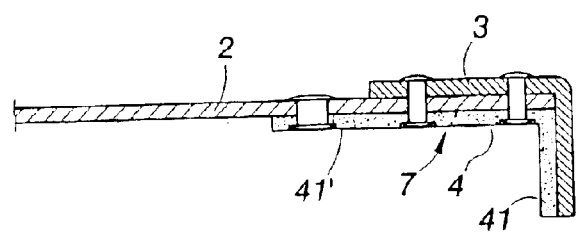
FIG. 21 shows a yet embodiment of the hook head of the present invention.

Referring to FIG. 20, when the ruler hook 3 is extended with a stopper 32. A slide-stop cover 49 extends upwards from the soft elastomer 4 for enclosing the stopper 32. Especially, an inner side of the stopper 32 absolutely encloses the ruler hook 3. With reference to FIG. 3, the soft elastomer 4 has a piece form to be adhered to an inner surface of the ruler hook 3. Namely, the soft elastomer 4 only has an inner surface 41 or a further extending surface 41' extending from the inner surface 41 toward a bottom of the ruler blade 2. Thereby, the hook head 7 has the effect of slide-proof.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A soft stop-proof hook head of a measure tape, the hook head being located at one outer end of the measure tape and comprising a ruler hook; characterized in that:

a surface of a ruler hook is enclosed by a soft elastomer; the soft elastomer is made of a flexible material; when the soft elastomer is pressed, it generates an elastic resistance; in measuring, the ruler hook is coupled to a measured bench mark of an object to be measured so as to have a slide-stop effect; and an inner lateral side of the soft elastomer is formed with a plurality of concave round air chambers.

2. A soft stop-proof hook head of a measure tape, the hook head being located at one outer end of the measure tape and comprising a ruler hook; characterized in that:

a surface of a ruler hook is enclosed by a soft elastomer; the soft elastomer is made of a flexible material; when the soft elastomer is pressed, it generates an elastic resistance; in measuring, the ruler hook is coupled to a measured bench mark of an object to be measured so as to have a slide-stop effect; and a distal end of the soft elastomer far away from an opening of the soft elastomer for receiving the ruler hook is extended with a flat slide-stop piece for enhancing the slide-stop effect.

3. The soft stop-proof hook head of a measure tape as claim in claim 2, wherein an upper end of the soft elastomer is extended with a slide-stop piece.

4. The soft stop-proof hook head of a measure tape as claim in claim 2, wherein the slide-stop piece is bent.

5. The soft stop-proof hook head of a measure tape as claim in claim 2, wherein the ruler hook has a stopper, an upper end of the soft elastomer is extended with a slide-stop cover for enclosing the stopper.

* * * * *